United States Patent Office 2,859,207
Patented Nov. 4, 1958

2,859,207

PROCESS OF PURIFICATION OF POLYVINYL ACETALS

Joseph Dahle, Allentown, Pa., assignor to Celanese Corporation of America, New York, N. Y., a corporation of Delaware No Drawing. Application May 24, 1955
Serial No. 510,830

11 Claims. (Cl. 260—73)

This invention relates to polyvinyl acetals and relates more particularly to the separation of polyvinyl acetal resins in relatively pure form from mixtures containing the same.

Polyvinyl acetal resins are generally produced by the reaction of aldehydes, such as formaldehyde, acetaldehyde, propionaldehyde, butyraldehyde, or valeraldehyde with polyvinyl alcohol or polyvinyl esters in the presence of acidic catalysts, e. g. sulfuric acid, in a liquid medium. After the acetalization reaction has proceeded to the desired extent the polyvinyl acetal resin is precipitated from the reaction medium by the addition of a non-solvent, preferably water, under agitation until discrete, hard, porous particles of the polyvinyl acetal resin are formed. The porous nature of the particles makes it easier to remove therefrom any acid constituents, salts and other impurities by repeated washing with water. However, because of the porosity of the particles it has been found necessary to use batch processes for the washing, since the particles entrap air, causing them to float to the surface of the wash liquid, thus making continuous washing on an efficient basis impractical. On the other hand, when a non-porous type of particle is produced, it is extremely difficult to wash out the impurities entrapped therein.

It is therefore an object of this invention to provide a novel process for the washing of polyvinyl acetal resins which will be free from the foregoing and other disadvantages.

Another object of this invention is the provision of a new process for the separation of lower molecular weight polymeric fractions from polyvinyl acetal resins.

Still another object of this invention is to provide a novel spraying procedure for the production of fine particles of polyvinyl acetal resins.

Other objects of this invention will be apparent from the following detailed description and claims. In this description and claims all proportions are by weight unless otherwise indicated.

In accordance with one aspect of this invention a solution of a polyvinyl acetal resin in a water-miscible solvent and containing minor amounts of impurities therein is mixed with sufficient aqueous non-solvent therefor to cause the formation of two distinct phases, namely a gel of the polyvinyl acetal resin, and a liquor comprising an aqueous mixture of the solvent and non-solvent. The two-phase mixture is fed continuously to a centrifuge wherein the liquor containing much of the impurities is removed from the gel. For best results the gel is then redissolved in the solvent and the process repeated, so that more of the impurities are removed. After the polyvinyl acetal resin has been purified to the desired extent it may be converted to hard solid particles in any desired manner.

In the practice of the present invention, the addition of the amount of non-solvent described above to the solution of polyvinyl acetal resin generally results, at first, in the production of a cloudy mixture comprising a suspension of the gel in the liquor. If allowed to stand, the gel settles to form a lower layer distinct from the liquor layer. The settled gel may be broken into small particles by more or less vigorous agitation, but when the agitation ceases, such particles agglomerate again. This tendency to agglomeration, even at room temperature, is characteristic of the gel.

One convenient method for converting the gel to hard particles involves spraying the gel into a zone where the liquid is removed from the gel. For example, the gel may be sprayed into water or, preferably, into an evaporative atmosphere, e. g. heated air. The spraying may be effected by the use of air or steam or other suitable gas under pressure. If desired the gel may be heated, e. g. to 75° C., before or during spraying to soften or liquefy it. This facilitates the comminution of the gel. The expansion occurring on spraying will cause the volatile liquids in the heated mixture to evaporate quickly, with corresponding quick cooling, gelling and hardening of each sprayed particle. A stabilizer of the type well known for polyvinyl acetal resins may be added to the gel before spraying or may be incorporated into the polyvinyl acetal resin at any other convenient stage of the process.

When the gel is sprayed there is little or none of the "cobwebbing" tendency observed during the spraying of solutions of polyvinyl resins.

In one convenient embodiment of the process of this invention the starting solution is a crude mixture obtained by the reaction of a polyvinyl compound (e. g. a polyvinyl alcohol or a polyvinyl ester such as polyvinyl acetate) with an aldehyde in a solvent containing an acid catalyst. This solution is neutralized, as with sodium hydroxide or sodium or magnesium acetate. Thereafter the non-solvent for the polyvinyl acetal resin, e. g. water, is added slowly with agitation, enough of the non-solvent being added to cause the formation of a polyvinyl acetal resin gel. Desirably, both the solution and the added non-solvent are maintained at an elevated temperature, e. g. 30 to 60° C. The use of an elevated temperature increases the efficiency of extraction of the impurities from the polyvinyl acetal resin. Thus, it increases the solubility of the impurities in the added non-solvent for polyvinyl acetal and also increases the tolerance of the gel for said non-solvent so that more of the latter may be added without causing precipitation of hard particles of the resin from the gel. Thereafter the gel and liquor are separated in a centrifuge, the gel is redissolved, and the operation described above is repeated.

I have found that polyvinyl acetal resins generally contain lower molecular weight polymers. It is believed that these lower polymers originate, in part, from the splitting off of branch chains from the polyvinyl ester or polyvinyl alcohol during hydrolysis or acetalization, or both. According to another aspect of this invention the process for the treatment of the polyvinyl acetal resin may also provide for the extraction of such lower molecular weight polymers from the polyvinyl acetal resin. Removal of such lower polymers is found to improve the uniformity and physical properties of the polyvinyl acetal resins. Also, the removed lower polymers are found to be useful in coating compositions, such as wash primers and the like, where a relatively low viscosity and high solids content are desirable.

To carry out the removal of the lower polymers, the amount and character of non-solvent is so regulated that the liquor in contact with the gel is a relatively good solvent for said low polymers. For example, when the non-solvent is water and the solution being treated comprises methanol and polyvinyl butyral, removal of low polymers to a very large extent can be obtained by so regulating the amount of water that the liquor in contact with the gel has a specific gravity of about 0.84 to 0.86 (the specific gravity being measured at room temperature, e. g. 25° C.), corresponding to a methyl alcohol content of the order of about 70 to 85%. On the other hand, if little or no removal of low polymers is desired, the amount of water added in this case is such that the specific gravity of said liquor is 0.93 or higher, though not sufficiently high to cause the precipitation of hard particles of the polyvinyl acetal resin from the gel. In order to provide for closer control of the process, especially on a commercial scale, the added non-solvent may be mixed with a proportion of a solvent for the polyvinyl acetal resin. Thus, ethanol or methanol may be mixed with the water used for the treatment.

The low polymers separated in the manner described above may, if desired, be fractionated into portions of different molecular weights for special purposes.

The process of this invention has found its greatest utility in the treatment of methanol solutions of polyvinyl butyral obtained by reaction of butyraldehyde and polyvinyl alcohol or a polyvinyl ester. However, it may be applied to solutions of other polyvinyl acetal resins and to solutions containing solvents other than methanol. Examples of other polyvinyl acetal resins are those obtained from formaldehyde, acetaldehyde, propionaldehyde and valeraldehyde, alone or in any mixture, in place of or in adition to the butyraldehyde. Examples of other solvents for the polyvinyl acetal resins are acetic acid, ethanol or propanol. For practical reasons and for best extraction of impurities, the non-solvent employed is generally water or, if desired, a mixture of water and a solvent for the polyvinyl acetal resin, e. g. an aqueous solution of methanol of 20% concentration. In fact, non-aqueous non-solvents (e. g. benzene or toluene) may be used instead of the aqueous non-solvent though the results, in terms of removal of inorganic impurities, are less desirable.

The process of this invention lends itself readily to continuous operation, since the mixing, separating and redissolving steps, as well as the spraying operation, may be carried out easily in conventional, continuously functioning units. Thus for continuous mixing there may be employed a tank equipped with an efficient stirrer and with means for continuously adding the polyvinyl acetate solution and the non-solvent and for continuously discharging the mixture of gel and liquor. A similar type of apparatus may be employed for the step of redissolving. Another form of apparatus for use in continuously redissolving the separated gel involves a suitable pump which forces the gel and added solvent continuously through slotted or perforated plates. For the continuous separation of the gel and liquor there may be employed the usual type of bowl centrifuge, such as a cream separator, or, instead, a Podbielnak multi-stage extractor.

The following examples are given to illustrate this invention further.

Example I

Polyvinyl acetate, having a molecular weight such that an 8.6% solution thereof in benzene has a viscosity of 15 centipoises, is hydrolyzed and reacted with butyraldehyde in methanol in the presence of 5% of sulfuric acid, based on the weight of polyvinyl acetate used, to produce a solution comprising 15% of polyvinyl butyral having a hydroxyl content (calculated as polyvinyl alcohol) of 21%, an acetate content (calculated as polyvinyl acetate) of less than 1%, and a butyral content (calculated as polyvinyl butyral) of over 78%. This solution is neutralized by the addition thereto of an amount of magnesium acetate stoichiometrically equivalent to the sulfuric acid employed, the magnesium acetate being supplied as a 10% solution in methanol. The neutralized solution is then warmed to 50° C. Water heated to 50° C. is then added gradually, with agitation, to cause the polyvinyl acetal resin to form a gel, the total amount of water being 14%, based on the weight of solution. The resulting mixture of gel and liquor is passed continuously to a centrifuge where these two phases are separated. The specific gravity of the separated liquor is about 0.89 measured at room temperature, its total solids content is 4.9% and its ash content is 2.5%, the balance of said solids being low polymers. The separated gel is then continuously redissolved in methanol, the amount of methanol being about equal to the weight of gel, and the resulting solution is continuously treated with water in a manner identical to that described above. This sequence is repeated a total of three times. Thereafter the gel is comminuted and dried. Particles of highly pure polyvinyl butyral substantially free of low polymers are obtained.

Example II

Example I is repeated except that the amount of water added is 40% instead of 14%. The specific gravity of the liquor is 0.92 instead of 0.89 and its total solids content is 2.9%, the ash content being 1.8%. The final product contains more of the low polymers than are found in the product of Example I.

It is to be understood that the foregoing detailed description is merely given by way of illustration and that many variations may be made therein without departing from the spirit of my invention.

Having described my invention, what I desire to secure by Letters Patent is:

1. In the process for the production of polyvinyl acetal resins, the steps which comprise adding an aqueous non-solvent liquid to a solution of an impure polyvinyl acetal resin in a solvent therefor, the amount and temperature of the aqueous non-solvent being such that a gel phase of said resin and a liquor phase, comprising an aqueous mixture of the solvent and non-solvent, are produced, and separating said liquor phase from said gel phase, said gel being characterized by the property of settling on standing to form a lower layer distinct from said liquor, which lower layer may be broken into small particles on vigorous agitation but which is reformed by particle agglomeration when the agitation ceases.

2. Process as set forth in claim 1, comprising further the steps of dissolving said gel phase in a solvent for said polyvinyl acetal after separating said liquor phase from said gel phase, and then repeating the process of claim 1 with the solution thus obtained.

3. Process as set forth in claim 1 in which the amount and temperature of the aqueous non-solvent are such that there are dissolved in said liquor phase the major proportion of polymers of such molecular weight that are soluble in methanol-water mixtures of specific gravity 0.84.

4. Process as set forth in claim 1 in which the amount and temperature of the aqueous non-solvent are such that there are dissolved in said liquor phase the major proportion of polymers of such molecular weight that are soluble in methanol-water mixtures of specific gravity 0.92.

5. Process as set forth in claim 1 in which said solvent comprises methanol.

6. Process as set forth in claim 5 in which said polyvinyl acetal is a polyvinyl butyral and in which the specific gravity of the liquor is between about 0.84 and about 0.93.

7. Process as set forth in claim 1 in which said solution of impure polyvinyl acetal resin is a neutralized reaction mixture obtained by the reaction of a polyvinyl resin selected from the group consisting of polyvinyl alcohol and polyvinyl esters with an aldehyde in the presence of said solvent and of sulfuric acid as a catalyst.

8. Process as set forth in claim 7 in which said aldehyde is butyraldehyde.

9. Process as set forth in claim 1 in which said separated gel phase is sprayed in particle form into a zone where the solvent and aqueous non-solvent are removed therefrom.

10. Process as set forth in claim 1 in which said separated gel phase is heated to liquefy it and the liquefied gel phase is sprayed in particle form into an evaporative atmosphere.

11. Process for the purification of polyvinyl butyral resins, which comprises providing a neutralized reaction mixture containing dissolved polyvinyl butyral resin and methanol and obtained by the reaction of a polyvinyl resin, selected from the group consisting of polyvinyl alcohol and polyvinyl esters, with butyraldehyde in the presence of methanol and of sulfuric acid as a catalyst, adding water to said solution while maintaining the resulting mixture at an elevated temperature of about 30 to 60° C., the amount of the water being such that a mixture of a gel phase of the polyvinyl butyral resin and a liquor phase comprising water and methanol is produced, continuously centrifuging said mixture of gel phase and liquor phase to separate the liquor phase from the gel phase, then continuously dissolving said gel phase in methanol continuously adding water to the resulting solution, while maintaining the resulting mixture at an elevated temperature of about 30 to 60° C., the amount of the water being such that a mixture of a gel phase comprising a gel of the polyvinyl butyral resin and a liquor phase comprising water and methanol is produced, and continuously centrifuging said mixture of gel phase and liquor phase to separate the liquor phase from the gel phase each of said gels being characterized by the property of settling on standing to form a lower layer distinct from said liquor, which lower layer may be broken into small particles on vigorous agitation but which is reformed by particle agglomeration when the agitation ceases.

References Cited in the file of this patent
UNITED STATES PATENTS

| | | |
|---|---|---|
| 2,194,613 | Perkins | Mar. 26, 1940 |
| 2,356,896 | Smith | Aug. 29, 1944 |